(12) United States Patent
Zhang et al.

(10) Patent No.: US 11,050,282 B2
(45) Date of Patent: Jun. 29, 2021

(54) POWER SUPPLY CONTROL METHOD AND DEVICE, STORAGE MEDIUM AND ELECTRONIC DEVICE

(71) Applicant: GUANGDONG OPPO MOBILE TELECOMMUNICATIONS CORP., LTD., Guangdong (CN)

(72) Inventors: Qiang Zhang, Guangdong (CN); Fanhong Kong, Guangdong (CN); Fuchun Liao, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 171 days.

(21) Appl. No.: 16/477,605

(22) PCT Filed: Oct. 18, 2017

(86) PCT No.: PCT/CN2017/106776
§ 371 (c)(1),
(2) Date: Jul. 12, 2019

(87) PCT Pub. No.: WO2018/129973
PCT Pub. Date: Jul. 19, 2018

(65) Prior Publication Data
US 2020/0091751 A1   Mar. 19, 2020

(30) Foreign Application Priority Data

Jan. 13, 2017   (CN) .......................... 201710026436.1

(51) Int. Cl.
*H02J 7/00* (2006.01)
(52) U.S. Cl.
CPC ............ *H02J 7/0068* (2013.01); *H02J 7/007* (2013.01); *H02J 2207/10* (2020.01)

(58) Field of Classification Search
CPC ........ H02J 2207/20; H02J 9/02; H02J 7/0068; H02J 1/10; H02J 1/001; H02J 7/34;
(Continued)

(56) References Cited

U.S. PATENT DOCUMENTS

| 6,864,669 | B1 | 3/2005 | Bucur |
| 2010/0013321 | A1* | 1/2010 | Onishi ................... H02J 7/025 307/104 |

(Continued)

FOREIGN PATENT DOCUMENTS

| CN | 101986502 A | 3/2011 |
| CN | 102255369 A | 11/2011 |

(Continued)

OTHER PUBLICATIONS

Third Chinese Office Action, Appln. No. 201710026436.1, dated Jul. 3, 2019.
(Continued)

*Primary Examiner* — Binh C Tat

(57) ABSTRACT

A power supply control method and device, a storage medium and an electronic device are provided. The method includes that: during charging, a battery is charged through a charging path of a charger, and power is supplied to an electronic device system through a power supplying path of the charger; a current voltage of the battery is detected in a charging process; whether the battery is completely charged or not is determined according to the current voltage of the battery; and the power supplying path of the charger and the charging path of the charger are turned off in response to determining that the battery is completely charged, and power is supplied to the electronic device system through the battery.

17 Claims, 11 Drawing Sheets

(58) Field of Classification Search
CPC .......... H02J 9/065; H02J 50/10; H02J 7/0029;
H02J 7/345; H02J 9/061; H02J 13/00006;
H02J 13/00017; H02J 13/0017; H02J
7/025; H02J 50/00; H02J 50/40; H02J
7/00306; H02J 7/00308; H02J 7/0042;
H02J 7/04; H02J 3/00; H02J 7/00714;
H02J 7/045; H02J 1/08; H02J 2007/0067;
H02J 2207/40; H02J 3/005; H02J 3/34;
H02J 7/00034; H02J 7/00036; H02J
7/0013; H02J 7/0025; H02J 7/007; H02J
9/06; H02J 50/80; H02J 7/00; H02J
7/0014; H02J 7/0016; H02J 7/0019; H02J
7/0024; H02J 7/00302; H02J 7/0031;
H02J 7/00712; H02J 7/008; H02J 7/02;
H02J 2007/10; H02J 2207/10; H02J
2207/30; H02J 50/05; H02J 50/12; H02J
50/402; H02J 50/90; H02J 7/00047; H02J
7/00711; H02J 7/007182; H02J 7/0086;
H02J 7/06; H02M 7/4807; H02M 1/4258;
H05B 45/357; H05B 45/56; H01M
2250/30; H01M 8/04567; H01M 8/04626;
H01M 8/04686; H01M 10/441; H01M
2250/402; H01M 8/04171; H01M
8/04223; H01L 23/58
USPC .................................................. 320/126–136
See application file for complete search history.

(56) References Cited

U.S. PATENT DOCUMENTS

| | | |
|---|---|---|
| 2013/0154568 A1 | 6/2013 | Li et al. |
| 2014/0265566 A1 | 9/2014 | Nguyen et al. |
| 2014/0339906 A1* | 11/2014 | Miyamoto ............. H02J 50/40 307/104 |
| 2014/0354050 A1 | 12/2014 | Kung et al. |
| 2015/0188346 A1* | 7/2015 | Oku ..................... H02J 7/0003 320/107 |
| 2016/0064959 A1 | 3/2016 | Jung et al. |

FOREIGN PATENT DOCUMENTS

| | | |
|---|---|---|
| CN | 102904290 A | 1/2013 |
| CN | 204131109 U | 1/2015 |
| CN | 104811015 A | 7/2015 |
| CN | 106532876 A | 3/2017 |
| TW | 201630761 A | 9/2016 |

OTHER PUBLICATIONS

The extended European search report for the EP patent application No. 17891710.0, dated Oct. 16, 2019.
The first examination report for the Indian patent application No. 201917032667, dated Jun. 11, 2020.
The first office action for the Chinese patent application No. 201710026436.1, dated Jun. 29, 2018.
The second office action for the Chinese patent application No. 201710026436.1, dated Feb. 19, 2019.
The fourth office action for the Chinese patent application No. 201710026436.1, dated Oct. 25, 2019.

* cited by examiner

POWER SUPPLY CONTROL METHOD AND DEVICE, STORAGE MEDIUM AND ELECTRONIC DEVICE

CROSS-REFERENCE TO RELATED APPLICATIONS

The present application is a national stage application of International Patent Application No. PCT/CN2017/106776, which is filed on Oct. 18, 2017 and claims priority to Chinese Patent Application No. 201710026436.1, filed on Jan. 13, 2017 and entitled "Power Supply Control Method and Device, and Computer device", the contents of which are hereby incorporated by reference in its entirety.

TECHNICAL FIELD

The application relates to the technical field of electronic device test, and particularly to a power supply control method and device, a storage medium and an electronic device.

BACKGROUND

At present, each of mobile phones on the market is provided with a Power Management Integrated Circuit (PMIC) for power management and a charging Integrated Circuit (IC) with a path management function. Herein, the charging IC may be configured to charge a battery of the mobile phone, and the PMIC may be configured to control power supply to each device in the mobile phone.

However, a withstand voltage of the PMIC is generally not so high and, for example, is usually 4.5V only, so that there exists a high probability of burnout in a charging process, and stability of the mobile phone is relatively poor.

SUMMARY

Embodiments of the application provide a power supply control method and device, a storage medium and an electronic device, which may improve stability of the electronic device.

According to a first aspect, the embodiments of the application provide a power supply control method, which may include that:

during charging, a battery is charged through a charging path of a charger, and power is supplied to an electronic device system through a power supplying path of the charger;

a current voltage of the battery is detected in a charging process;

whether the battery is completely charged or not is determined according to the current voltage of the battery; and the power supplying path of the charger and the charging path of the charger are turned off in response to determining that the battery is completely charged, and power is supplied to the electronic device system through the battery.

According to a second aspect, the embodiments of the application provide a power supply control device, which may include:

a power supply module, configured to, during charging, charge a battery through a charging path of a charger and supply power to an electronic device system through a power supplying path of the charger;

a detection module, configured to detect a current voltage of the battery in a charging process;

a determination module, configured to determine, according to the current voltage of the battery, whether the battery is completely charged or not; and a path control module, configured to turn off, in response to determining, by the determination module, that the battery is completely charged, the power supplying path of the charger and the charging path of the charger and supply power to the electronic device system through the battery.

According to a third aspect, the embodiments of the application provide an electronic device, which may include a memory, a processor and a computer program stored in the memory and executable for the processor, the processor executing the computer program to implement the following operations:

during charging, a battery is charged through a charging path of a charger, and power is supplied to an electronic device system through a power supplying path of the charger;

a current voltage of the battery is detected in a charging process;

whether the battery is completely charged or not is determined according to the current voltage of the battery; and the power supplying path of the charger and the charging path of the charger are turned off in response to determining that the battery is completely charged, and power is supplied to the electronic device system through the battery.

According to a fourth aspect, the embodiments of the application provide a storage medium, which may store multiple instructions, the instructions being able to be loaded by a processor to execute all or part of a charging control method.

According to the power supply control method and device, storage medium and electronic device provided in the embodiments of the application, stability of the electronic device may be improved.

BRIEF DESCRIPTION OF THE DRAWINGS

In order to describe the technical solutions in the embodiments of the application more clearly, the drawings required to be used for descriptions about the embodiments will be simply introduced below. It is apparent that the drawings described below are only some embodiments of the application. Those skilled in the art may further obtain other drawings according to these drawings without creative work.

DETAILED DESCRIPTION OF THE EMBODIMENTS

Figure 1:
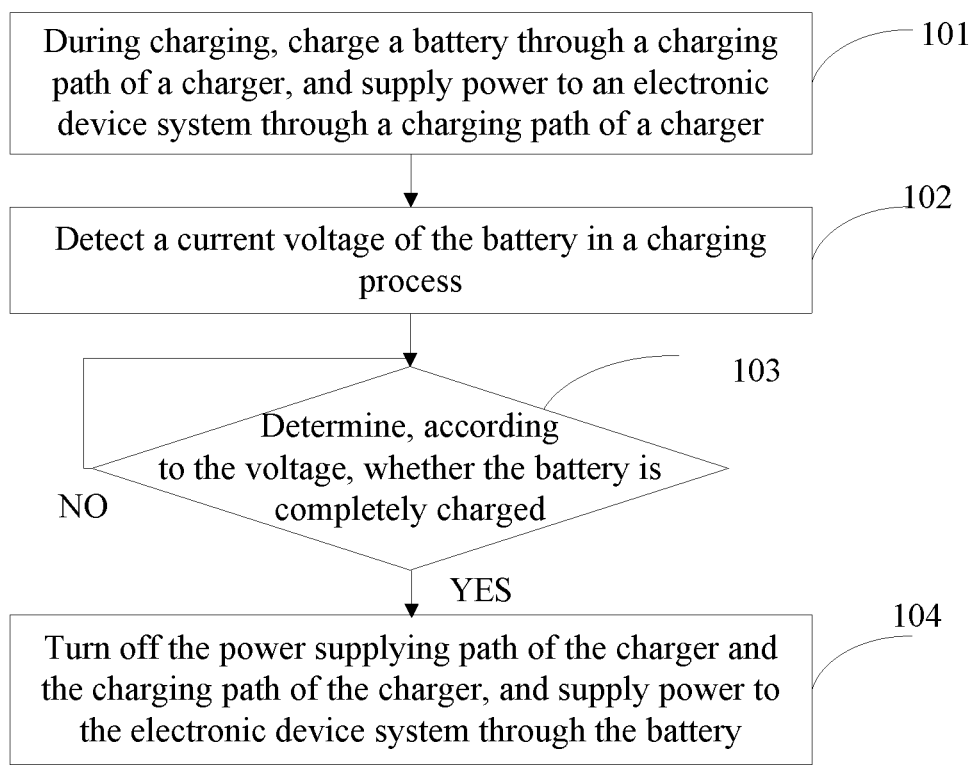
FIG. 1 is a flowchart of a power supply control method according to an embodiment of the application.

The technical solutions in the embodiments of the application will be clearly and completely described below in combination with the drawings in the embodiments of the application. It is apparent that the described embodiments are not all embodiments but only part of embodiments of the application. All of other embodiments obtained by those skilled in the art on the basis of the embodiments in the application without creative work shall fall within the scope of protection of the application.

Terms "first", "second", "third", "fourth" and the like in the application are adopted not to describe a specific sequence but to distinguish different objects. In addition, terms "include" and "have" and any transformation thereof are intended to cover nonexclusive inclusions. For example, a process, method, system, product or device including a series of operations or units is not limited to the listed operations or units, but optionally further includes operations or units which are not limited, or optionally further includes other inherent operations or units of the process, the method, the product or the device.

"Embodiment" mentioned in the disclosure means that a specific characteristic, structure or property described in combination with an embodiment may be included in at least one embodiment of the application. Appearance of this phrase at each position in the specification may not always refer to the same embodiment as well as an independent or alternative embodiment mutually exclusive with the other embodiments. Those skilled in the art explicitly and implicitly understand that the embodiments described in the disclosure may be combined with the other embodiments.

An execution body of a power supply control method provided in the embodiments of the application may be a power supply control device provided in the embodiments of the application or an electronic device integrated with the power supply control device. The power supply control device may be implemented by hardware or software. The electronic device described in the embodiments of the application may be a smart phone (for example, an Android phone and a Windows phone), a tablet computer, a palm computer, a notebook computer or a Mobile Internet Device (MID). The electronic device exemplarily but non-exhaustively includes, but not limited to, the abovementioned electronic devices.

The embodiments of the application provide a power supply control method and device and an electronic device, which will be respectively described below in detail.

An embodiment of the application provides a charging control solution, including operations as follows.

A power supply control method includes that:

during charging, a battery is charged through a charging path of a charger, and power is supplied to an electronic device system through a power supplying path of the charger;

a current voltage of the battery is detected in a charging process;

whether the battery is completely charged or not is determined according to the current voltage of the battery; and the power supplying path of the charger and the charging path of the charger are turned off in response to determining that the battery is completely charged, and power is supplied to the electronic device system through the battery.

In some embodiments, the operation that whether the battery is completely charged or not is determined according to the current voltage of the battery includes that:

when the current voltage of the battery is higher than a first preset voltage for more than a preset duration, it is determined that the battery is completely charged.

In some embodiments, after the operation that power is supplied to the electronic device system through the battery, the power supply control method further includes that:

when the current voltage of the battery is lower than a second preset voltage, the power supplying path of the charger and the charging path of the charger are turned on; and the battery is charged through the charging path of the charger, and power is supplied to the electronic device system through the power supplying path of the charger.

In some embodiments, the operation that the battery is charged through the charging path of the charger and power is supplied to the electronic device system through the power supplying path of the charger includes that:

a current input by a charger is received, and the current is divided into a first current and a second current;

the first current is transmitted to the battery to charge the battery through the charging path of the charger; and the second current is transmitted to the electronic device system to supply power to the electronic device system through the power supplying path of the charger.

In some embodiments, the operation that the power supplying path of the charger and the charging path of the charger are turned on includes that:

the charging path of the charger is turned on;

a voltage difference value between the current voltage of the battery and a first preset voltage is acquired; and when the voltage difference value is greater than a preset threshold value, the power supplying path of the charger is turned on.

In some embodiments, after the operation that whether the battery is completely charged or not is determined according to the current voltage of the battery, the method further includes that:

the current voltage of the battery is continued to be detected in response to determining that the battery is not completely charged.

In some embodiments, the operation that whether the battery is completely charged or not is determined according to the current voltage of the battery further includes that:

when the current voltage of the battery is not higher than the first preset voltage or when the current voltage of the battery is higher than the first preset voltage for less than the preset duration, it is determined that the battery is not completely charged.

In an exemplary embodiment, a power supply control method is provided. As shown in FIG. 1, the flow may be as follows.

In operation 101, during charging, a battery is charged through a charging path of a charger, and power is supplied to an electronic device system through a charging path of a charger.

During charging, generally, the charger needs not only to charge the battery, but also to supply power to the electronic device system. In the embodiment, the battery is charged through the charging path of the charger, and power is supplied to the electronic device system through the power supplying path of the charger.

Herein, the charging path of the charger is a path through which a charger charges the battery. During a practical application, the charging path of the charger may be a charging line between a charging IC and the battery.

The power supplying path of the charger is a path through which the charger supplies power to the electronic device system. During a practical application, the power supplying path of the charger may be a line between the charging IC and a power supply end of the electronic device system and, for example, may be a line between the charging IC and a PMIC.

In the embodiment, a current input by the charger may be divided into two currents respectively for charging and system power supply. That is, the operation that "the battery is charged through the charging path of the charger and power is supplied to the electronic device system through the charging path of the charger" may include that:

a current input by a charger is received, and the current is divided into a first current and a second current;

the first current is transmitted to the battery to charge the battery through the charging path of the charger; and the second current is transmitted to the electronic device system to supply power to the electronic device system through the power supplying path of the charger.

Figure 2:
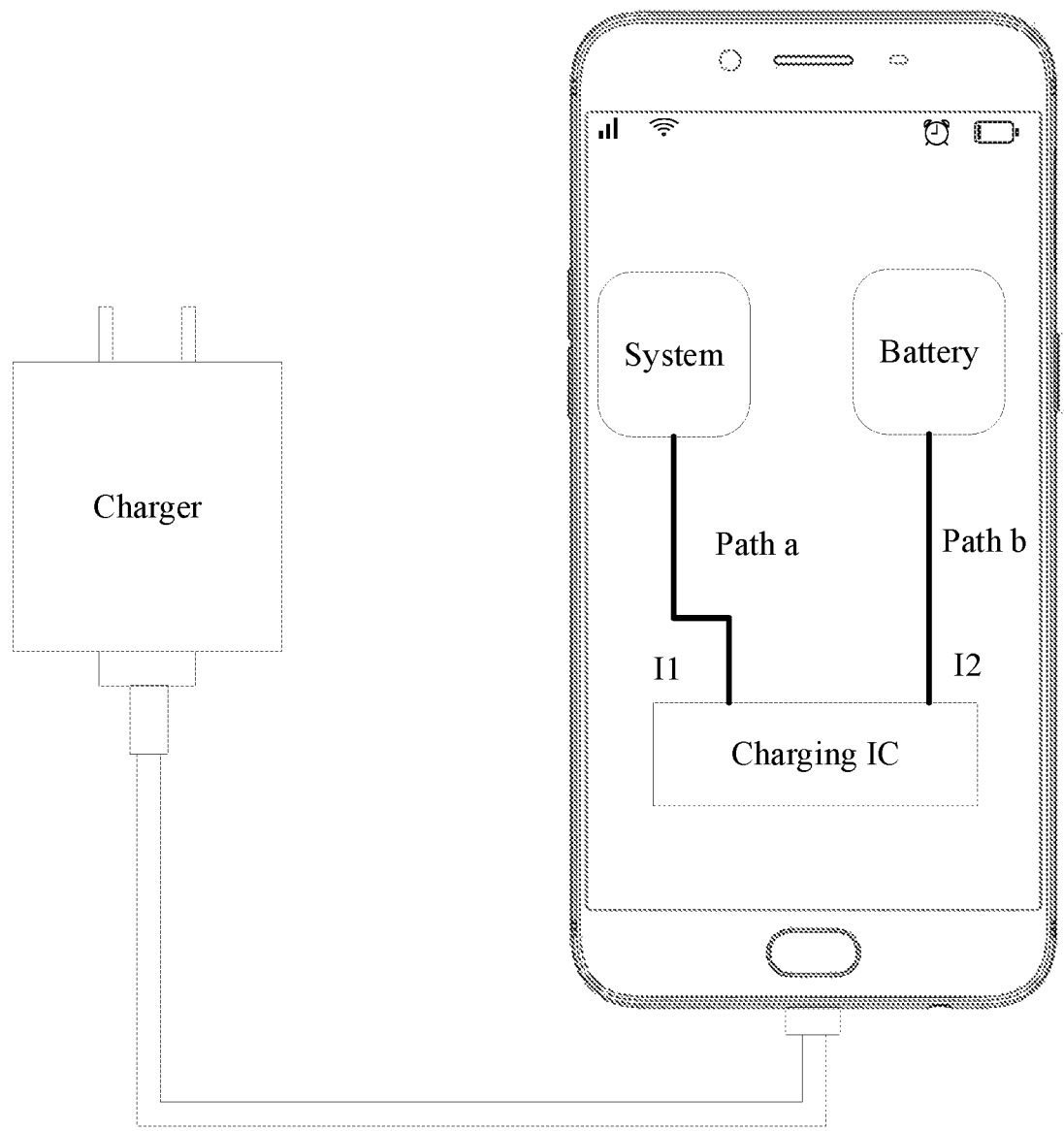
FIG. 2 is a schematic diagram of a first charging scenario of an electronic device according to an embodiment of the application.

Referring to FIG. 2, for example, a power supply control device is integrated into the charging IC. When an electronic device is charged, the charging IC divides the current I input by the charger into I1 and I2, then transmits I1 to the battery to charge the battery through the charging path a of the charger and transmits I2 to the electronic device system to supply power to the electronic device system through the power supplying path b of the charger.

In operation 102, a current voltage of the battery is detected in a charging process.

For example, in the charging process of the battery, the current voltage of the battery, i.e., a battery voltage, is monitored in real time. In such a manner, whether the battery is completely charged or not, namely whether charging is completed or not, may be determined through the battery voltage.

In operation 103, whether the battery is completely charged or not is determined according to the current voltage of the battery, operation 104 is executed in response to determining that the battery is completely charged, and operation 102 is re-executed in response to determining that the battery is not completely charged, so as to continue to detect the current voltage of the battery.

Herein, whether the battery is completely charged or not may be determined according to the current voltage of the battery in multiple manners. For example, when the battery voltage is higher than a preset voltage (for example, 4.3V), it is determined that the battery has been completely charged. For another example, when the battery voltage is kept higher than the preset voltage for a certain duration, it is determined that the battery has been completely charged. That is, the operation that "whether the battery is completely charged or not is determined according to the current voltage of the battery" may include that:

when the current voltage of the battery is higher than a first preset voltage for more than a preset duration, it is determined that the battery is completely charged; and when the current voltage of the battery is not higher than the first preset voltage or when the current voltage of the battery is higher than the first preset voltage for less than the preset duration, it is determined that the battery is not completely charged.

For example, the battery voltage may be cyclically detected within the preset duration at a certain time interval, and every time when the detected battery voltage is higher than the first preset voltage, it is determined that the battery voltage is higher than the first preset voltage and the duration is longer than the preset duration.

Herein, the first preset voltage and the preset duration may be set according to a practical requirement. For example, the first preset voltage may be 4.3V, 4.4V and the like, and the preset duration may be 1 minute, 2 minutes and the like.

In operation 104, the power supplying path of the charger and the charging path of the charger are turned off, and power is supplied to the electronic device system through the battery.

In the embodiment, responsive to detecting that the battery is completely charged, the charging path of the charger is turned off to stop supplying power to the battery, and the power supplying path of the charger may also be turned off to cut off power supply to the electronic device system and then switched to the battery to supply power to the electronic device system. In such a manner, the phenomenon that the PMIC is burned out because the charger applies a voltage through the power supplying path of the charger to increase a power supply voltage of the system when the battery supplies power to the system may be avoided.

At present, the charger supplies power to the charger and charges the battery through the charging IC, and during charging, the power supply voltage Vsys of the system is equal to the battery voltage Vbat, namely Vsys=Vbat. When the battery is completely charged, the charger may turn off the charging path for charging the battery and apply a voltage of about 150 mv to the system through the charger power supply system to avoid power supply of the battery to the system. In such case, Vsys=Vbat+150 mv, Vsys being higher than the battery voltage, and relatively high Vsys may burn out the PMIC with a relatively low withstand voltage.

Figure 3:
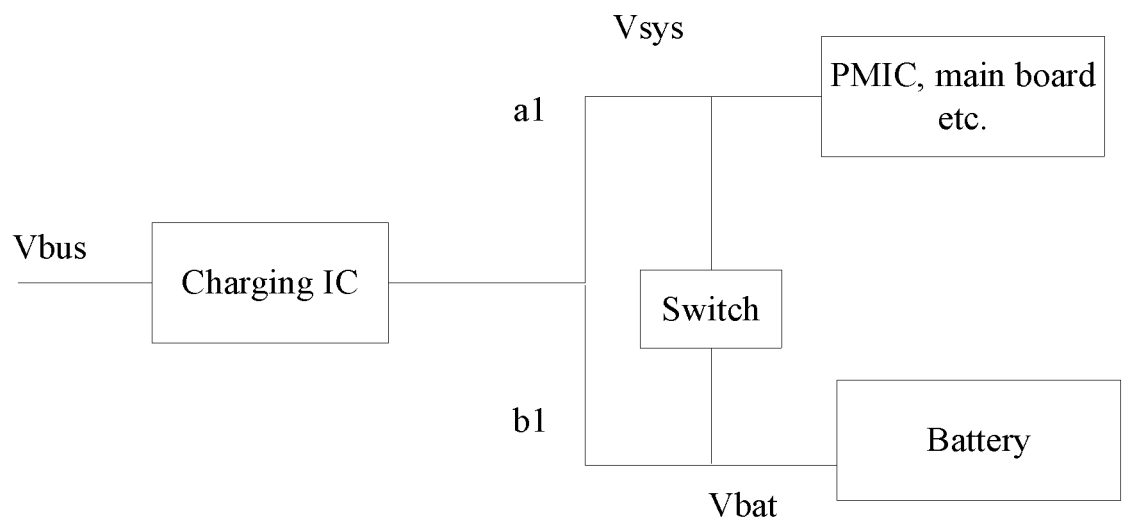
FIG. 3 is a schematic diagram of a conventional charging scenario of an electronic device.

For example, referring to FIG. 3, the charging IC supplies power to the system (for example, supplying power to the PMIC and a main board) through the power supplying path a1 of the charger and charges the battery through the charging path b1 of the charger, and a switch (for example, a field effect transistor) is arranged between the power supplying path a1 of the charger and the charging path b1 of the charger. When the battery is completely charged or not charged, the switch turns off the charging path b1 for charging the battery. For preventing discharge of the battery and further avoiding power supply of the battery to the system, the charging IC may usually apply a voltage with a preset magnitude, usually 150 mv, to the system (for example, a connecting end of the system) through the power supplying path a1. In such case, the system voltage Vsys=Vbat+150 mv, Vsys being higher than the battery voltage, and the battery may not be discharged to supply power to the system. However, relatively high Vsys may burn out the PMIC with the relatively low withstand voltage.

Figure 4:
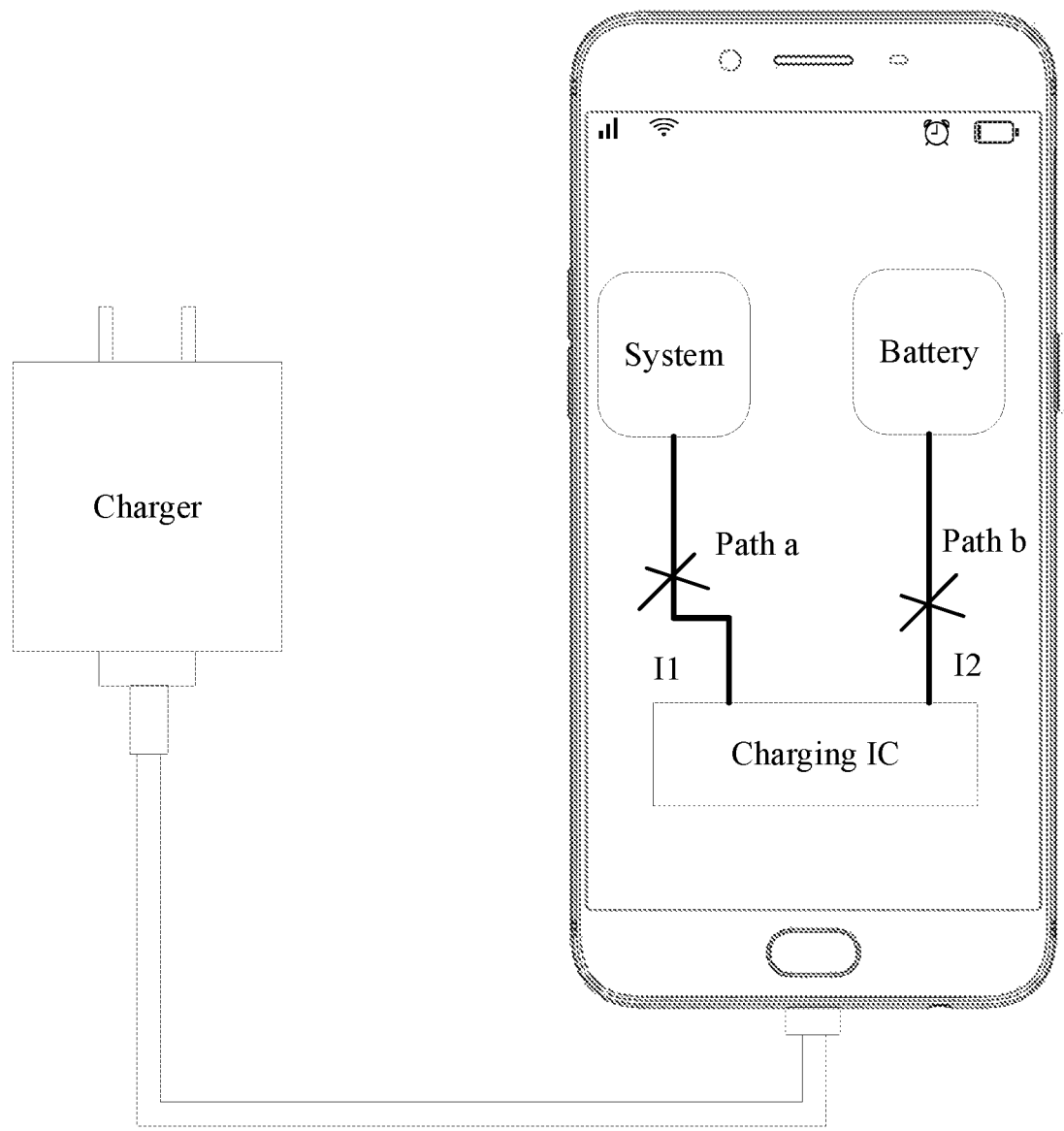
FIG. 4 is a schematic diagram of a second charging scenario of an electronic device according to an embodiment of the application.

According to the method of the embodiment, when the battery is completely charged, the power supplying path of the charger can be timely turned off to prevent increase of Vsys, burnout of the PMIC with the relatively low withstand voltage and reduction in stability of the electronic device. For example, referring to FIG. 4, when the battery is completely charged, the charging path a of the charger and the power supplying path b of the charger may be turned off.

Figure 5:
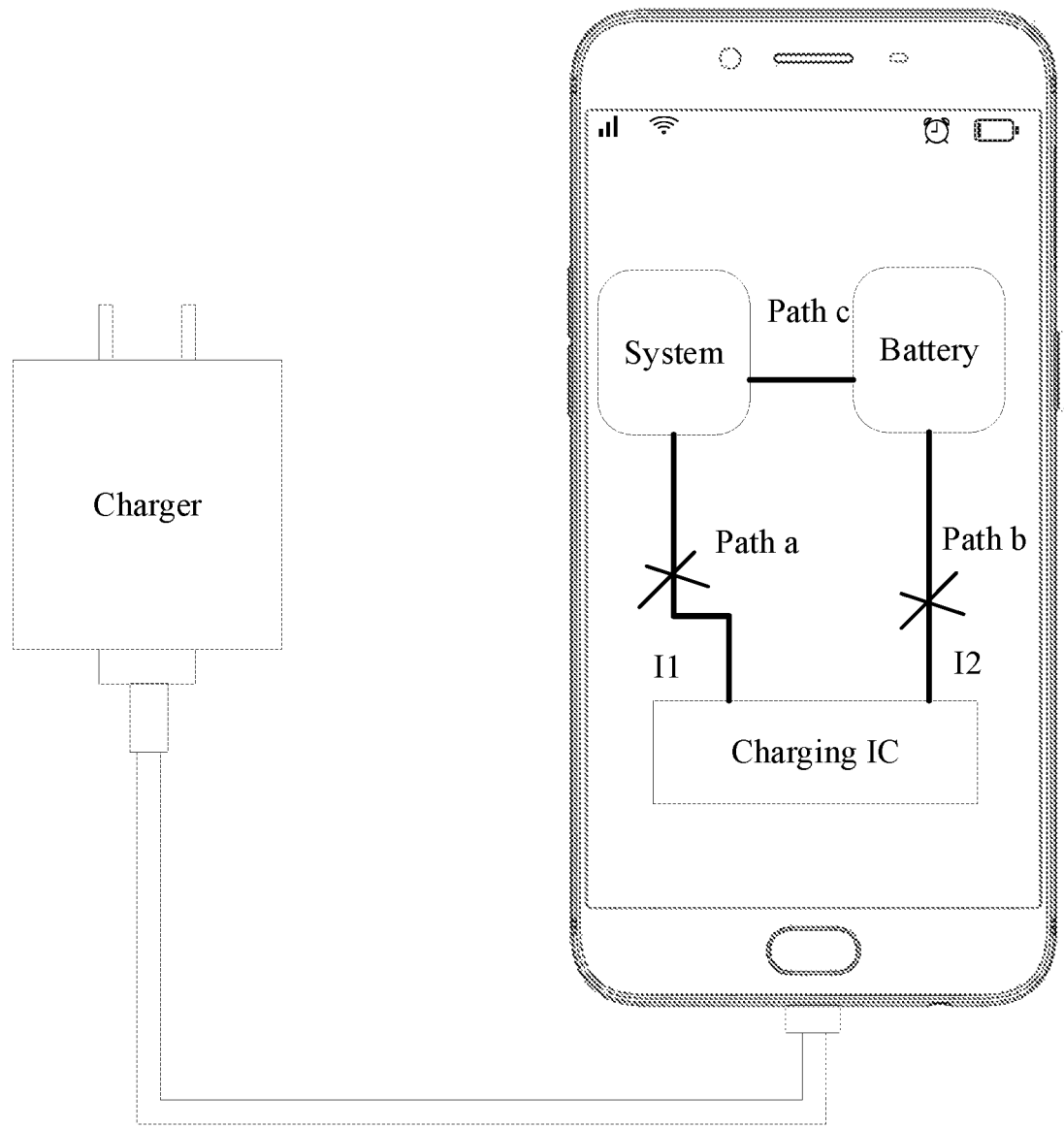
FIG. 5 is a schematic diagram of a third charging scenario of an electronic device according to an embodiment of the application.

According to the embodiment, an implementation mode for supplying power to the electronic device system through the battery may be turning on a power supplying path of the battery to supply power to the electronic device system through the battery. Referring to FIG. 5, when the battery is completely charged, the charging path a of the charger and the power supplying path b of the charger may be turned off, and a power supplying path c of the battery may be turned on to supply power to the electronic device system through the battery.

Figure 6:
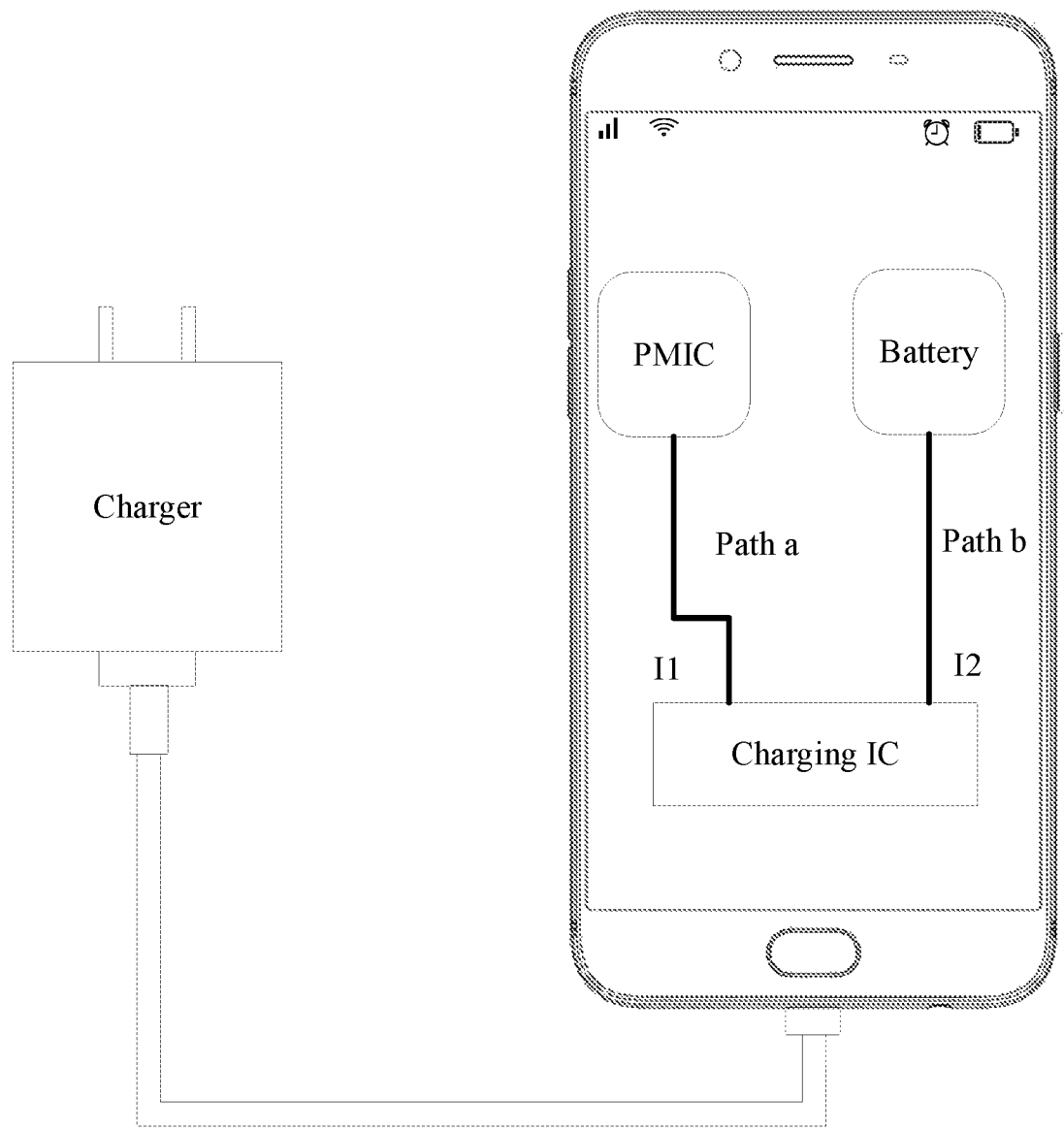
FIG. 6 is a schematic diagram of a fourth charging scenario of an electronic device according to an embodiment of the application.

Referring to FIG. 6, the PMIC in the embodiment is a circuit for power management, and the circuit may control power supply to each component of the system. Therefore, the charging IC may output a voltage to the PMIC through the power supplying path b of the charger to supply power to the system. When the battery is completely charged, the battery outputs a voltage to the PMIC through the power supplying path c of the battery to supply power to the system.

As an exemplary implementation of the embodiment, after switching to adoption of the battery for power supply to the electronic device system, the battery voltage may continue to be detected, and when the battery voltage is lower than a certain value, the battery may be recharged and power is supplied to the system through the charger. That is, after the operation that power is supplied to the electronic device system through the battery, the method of the embodiment may further include that:

when the current voltage of the battery is lower than a second preset voltage, the power supplying path of the charger and the charging path of the charger are turned on; and the battery is charged through the charging path of the charger, and power is supplied to the electronic device system through the power supplying path of the charger.

Figure 7:
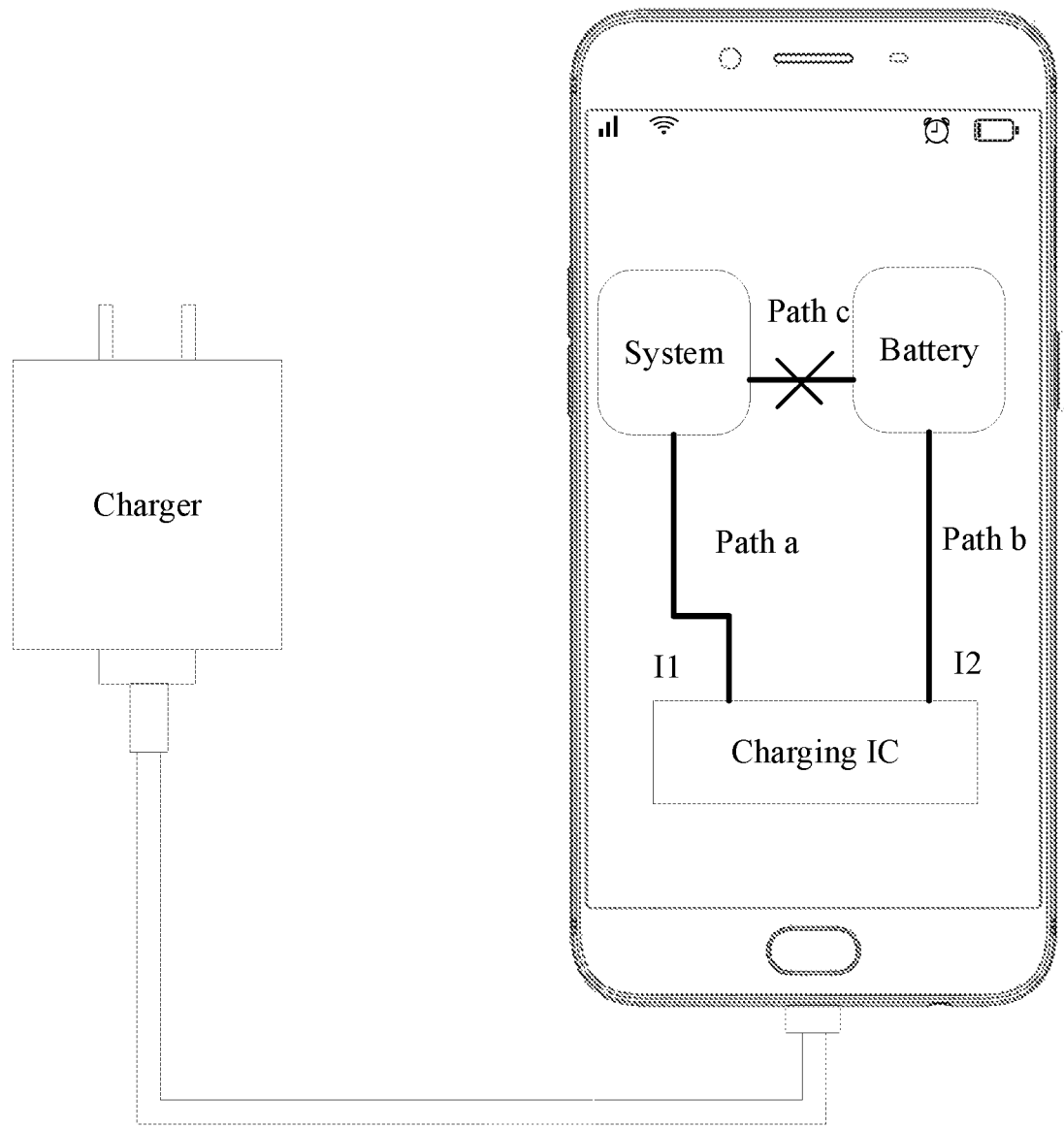
FIG. 7 is a schematic diagram of a fifth charging scenario of an electronic device according to an embodiment of the application.

Referring to FIG. 7, when the current voltage of the battery is lower than the preset voltage, the power supplying path b of the charger and the charging path a of the charger may be turned on, and then the power supplying path c of the battery is turned off. In such a manner, the battery may be recharged through the charging path a of the charger, and power may be supplied to the electronic device system through the power supplying path b of the charger.

In an exemplary implementation, when the battery voltage is not greatly different from the first preset voltage (i.e., a complete charging voltage), the battery may continue supplying power to the system, and if the battery voltage is greatly different from the first preset voltage, power may be supplied to the system through the charger. In such a manner, the number of path switching times may be reduced, and resources of the electronic device may be saved. That is, the operation that "the power supplying path of the charger and the charging path of the charger are turned on" may include that:

the charging path of the charger is turned on;
a voltage difference value between the current voltage of the battery and a first preset voltage is acquired; and
when the voltage difference value is greater than a preset threshold value, the power supplying path of the charger is turned on.

Herein, the preset threshold value may be set according to a practical requirement, for example, 1 v and 1.5 v.

For example, after power is supplied to the system through the battery and when the battery voltage Vbat is lower than a recharging voltage threshold value V1, the charging path of the charger is turned on, a difference value $\Delta V=V2-Vbat$ between the battery voltage Vbat and a complete charging voltage threshold value V2 is acquired, and when $\Delta V$ is less than a certain threshold value, the power supplying path of the charger is turned on to supply power to the system through the charger.

From the above, it can be seen that, according to the embodiment of the application, during charging, the battery is charged through the charging path of the charger, and power is supplied to the electronic device system through the power supplying path of the charger; then the current voltage of the battery is detected in the charging process; whether the battery is completely charged or not is determined according to the current voltage of the battery; and the power supplying path of the charger and the charging path of the charger are turned off in response to determining that the battery is completely charged, and power is supplied to the electronic device system through the battery. According to the solution, when the battery is completely charged, the power supplying path of the charger may be turned off to cut off power supply of the charger to the electronic device system, and burnout of the PMIC due to increase of the power supply voltage of the system when the battery is completely charged may be prevented. Therefore, the stability of the electronic device may be improved, and service life of the electronic device may be prolonged.

In an exemplary embodiment, the power supply control method of the application will be introduced with integration of the power supply control device in the electronic device as an example. The electronic device may be a mobile phone, a tablet computer and the like.

Figure 8:
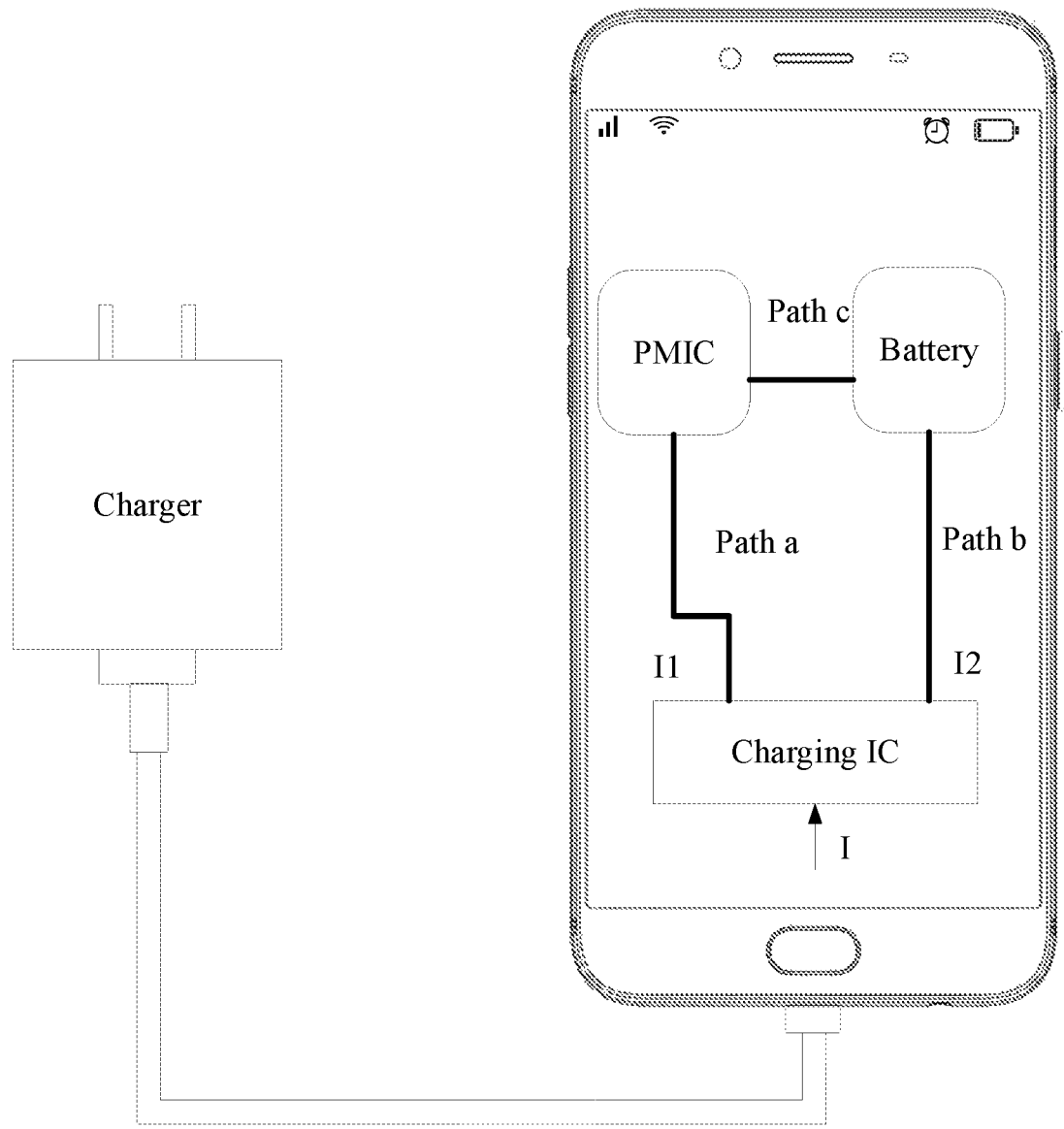
FIG. 8 is a schematic diagram of a sixth charging scenario of an electronic device according to an embodiment of the application.

Referring to FIG. 8, the charger is connected with the electronic device during charging, and the charger charges a battery of the electronic device through this connection and supplies power to the electronic device system.

Figure 9:
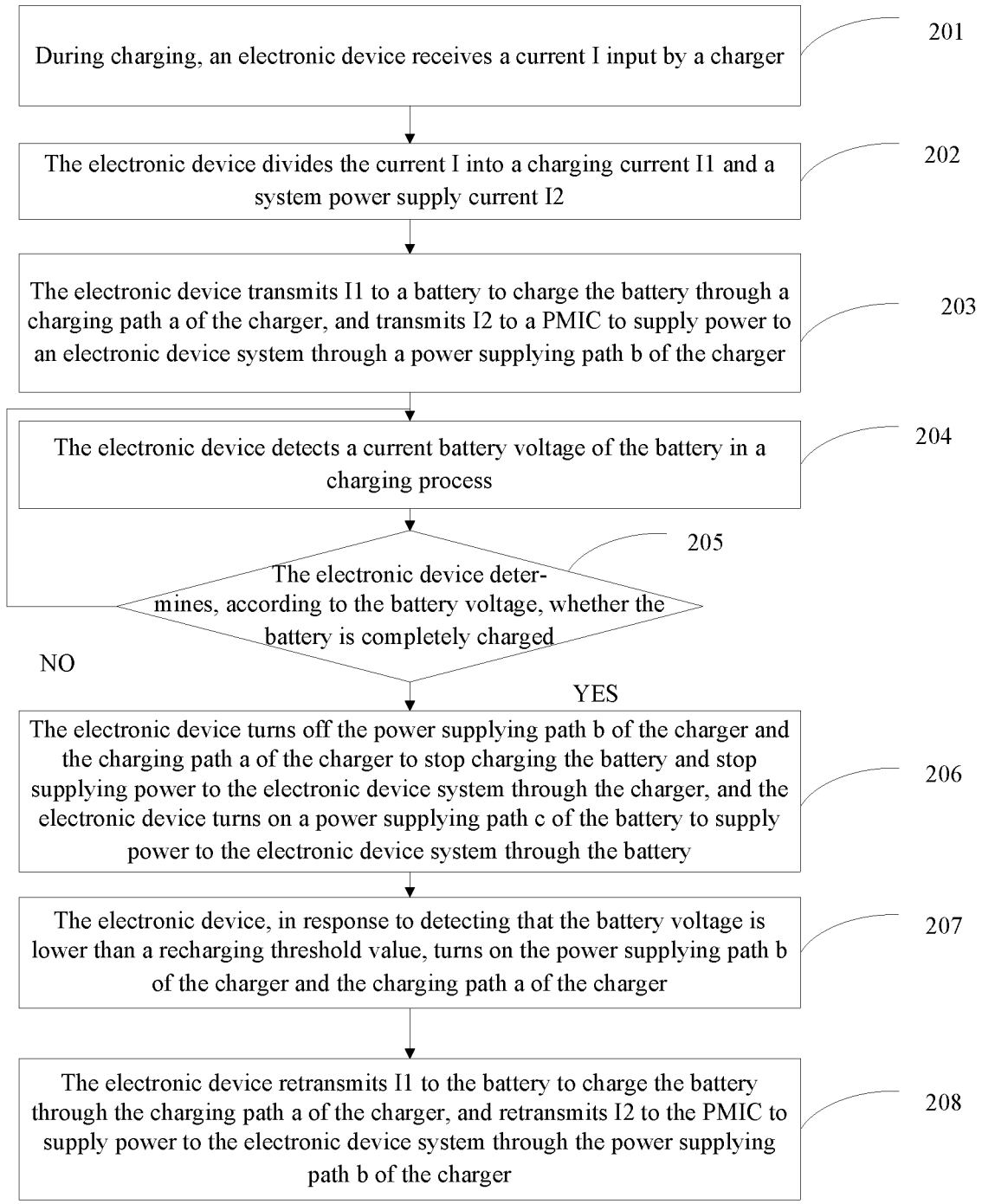
FIG. 9 is a flowchart of another power supply control method according to an embodiment of the application.

Referring to FIG. 9, an exemplary implementation process of a power supply method provided in an embodiment of the application is as follows.

In operation 201, an electronic device receives a current I input by a charger during charging.

When the electronic device is connected with the charger for charging, the charger may input the current to the electronic device to charge a battery.

In operation 202, the electronic device divides the current I into a charging current I1 and a charging current I2.

Herein, the charging current I1 may be determined according to a practical requirement, and generally, I1=100 mA-1,000 mA.

In operation 203, the electronic device transmits I1 to the battery to charge the battery through a charging path a of the charger, and transmits I2 to a PMIC to supply power to an electronic device system through a power supplying path b of the charger.

Power supply to the system is controlled by the PMIC, and the electronic device transmits I2 to the PMIC to enable the PMIC to supply power to each device in the system.

In operation 204, the electronic device detects a current battery voltage of the battery in a charging process.

For example, the current battery voltage of the battery is polled and detected in each preset time period in the charging process.

In operation 205, the electronic device determines whether the battery is completely charged or not according to the battery voltage, executes operation 206 in response to determining that the battery is completely charged, and re-executes operation 204 in response to determining that the battery is not completely charged, so as to continue to detect the current voltage of the battery.

For example, the electronic device may determine that the battery is completely charged when the battery voltage is higher than a preset voltage for more than a preset duration. For example, when the battery voltage is higher than a certain threshold value, it is determined that the battery is completely charged.

In operation 206, the electronic device turns off the power supplying path b of the charger and the charging path a of the charger to stop charging the battery and stop supplying power to the electronic device system through the charger, and the electronic device turns on a power supplying path c of the battery to supply power to the electronic device system through the battery.

When the battery is completely charged, the electronic device may turn on the power supplying path c of the battery and then control the battery to input a current or a voltage to the PMIC to supply power to the system through the power supplying path c of the battery.

In operation 207, the electronic device, responsive to detecting that the battery voltage is lower than a recharging threshold value, turns on the power supplying path b of the charger and the charging path a of the charger.

When power is supplied to the system through the battery, the electronic device may poll and detect the battery voltage, judge whether the battery voltage is lower than the recharging threshold value or not and, in response to determining that the battery is completely charged, turn on the power supplying path b of the charger and the charging path a of the charger to enable the charger to charge the battery of the electronic device and supply power to the system.

The recharging threshold value may be set according to the practical requirement and, for example, may be 3.5V.

In operation 208, the electronic device retransmits I1 to the battery to charge the battery through the charging path a of the charger and retransmits I2 to the PMIC to supply power to the electronic device system through the power supplying path b of the charger.

From the above, it can be seen that, according to the embodiment of the application, during charging, the battery is charged through the charging path of the charger, and power is supplied to the electronic device system through the power supplying path of the charger; then the current voltage of the battery is detected in the charging process; whether the battery is completely charged or not is determined according to the current voltage of the battery; and the power supplying path of the charger and the charging path of the charger are turned off in response to determining that the battery is completely charged, and power is supplied to the electronic device system through the battery. According to the solution, when the battery is completely charged, the power supplying path of the charger may be turned off to cut off power supply of the charger to the electronic device system, and burnout of the PMIC due to increase of a power supply voltage of the system when the battery is completely charged may be prevented. Therefore, stability of the electronic device may be improved, and service life of the electronic device may be prolonged.

For better implementing the power supply control method provided in the embodiments of the application, an embodiment of the application also provides a device based on the power supply control method. Herein, meanings of nouns are the same as those in the power supply control method, and specific implementation details may refer to descriptions in the method embodiments.

A power supply control device includes:

a power supply module, configured to, during charging, charge a battery through a charging path of a charger and supply power to an electronic device system through a power supplying path of the charger;

a detection module, configured to detect a current voltage of the battery in a charging process;

a determination module, configured to determine, according to the current voltage of the battery, whether the battery is completely charged or not; and a path control module, configured to turn off, in response to determining, by the determination module, that the battery is completely charged, the power supplying path of the charger and the charging path of the charger and supply power to the electronic device system through the battery.

In some embodiments, the determination module is configured to, when the current voltage of the battery is higher than a first preset voltage for more than a preset duration, determine that the battery is completely charged.

In some embodiments, the device further includes:

a path turning-on module, configured to, after power is supplied to the electronic device system through the battery and when the current voltage of the battery is lower than a second preset voltage, turn on the power supplying path of the charger and the charging path of the charger; and a charging module, configured to charge the battery through the charging path of the charger and supply power to the electronic device system through the power supplying path of the charger.

In some embodiments, the power supply module includes:

a receiving submodule, configured to receive a current input by a charger and divide the current into a first current and a second current;

a charging submodule, configured to transmit the first current to the battery to charge the battery through the charging path of the charger; and a power supply submodule, configured to transmit the second current to the electronic device system to supply power to the electronic device system through the power supplying path of the charger.

In some embodiments, the path turning-on module includes:

a first turning-on submodule, configured to turn on the charging path of the charger;

an acquisition submodule, configured to acquire a voltage difference value between the current voltage of the battery and a first preset voltage; and a second turning-on submodule, configured to, when the voltage difference value is greater than a preset threshold value, turn on the power supplying path of the charger.

In some embodiments, the determination module is further configured to continue, in response to determining that the battery is not completely charged, to detect the current voltage of the battery.

In some embodiments, the determination module is further configured to, when the current voltage of the battery is not higher than the first preset voltage or when the current voltage of the battery is higher than the first preset voltage for less than the preset duration, determine that the battery is not completely charged.

In an exemplary embodiment, a power supply control device is also provided. The power supply control device may be integrated into an electronic device. The electronic device may be a device such as a Personal Computer (PC), a notebook computer and a smart phone.

Figure 10:
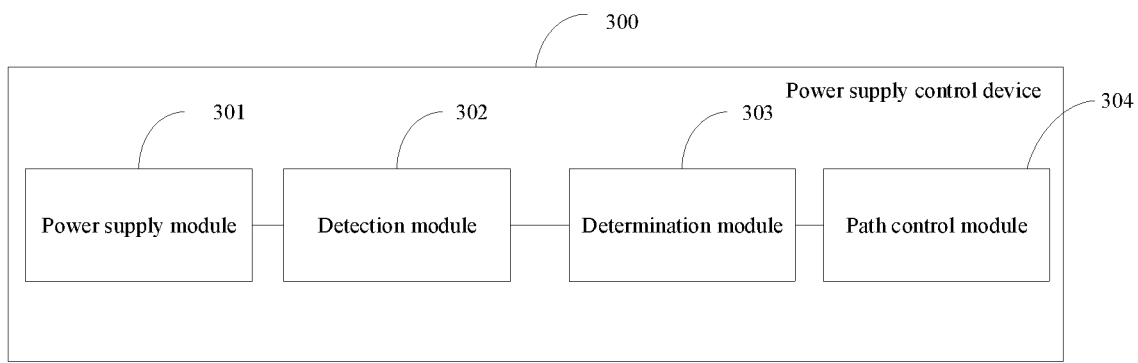
FIG. 10 is a structure diagram of a power supply control device according to an embodiment of the application.

As shown in FIG. 10, the power supply control device 300 may include a power supply module 301, a detection module 302, a determination module 303 and a path control module 304, as follows.

The power supply module 301 is configured to, during charging, charge a battery through a charging path of a charger and supply power to an electronic device system through a power supplying path of the charger.

The detection module 302 is configured to detect a current voltage of the battery in a charging process.

The determination module 303 is configured to determine, according to the current voltage of the battery, whether the battery is completely charged or not.

The path control module 304 is configured to, responsive to determining, by the determination module 303, that the battery is completely charged, turn off the power supplying path of the charger and the charging path of the charger and supply power to the electronic device system through the battery.

Herein, the charging path of the charger is a path through which a charger charges the battery. During a practical application, the charging path of the charger may be a charging line between a charging IC and the battery.

The power supplying path of the charger is a path through which the charger supplies power to the electronic device system. During a practical application, the power supplying path of the charger may be a line between the charging IC and a power supply end of the electronic device system and, for example, may be a line between the charging IC and a PMIC.

For example, the determination module 303 is configured to, when the current voltage of the battery is higher than a first preset voltage for more than a preset duration, determine that the battery is completely charged.

Figure 11:
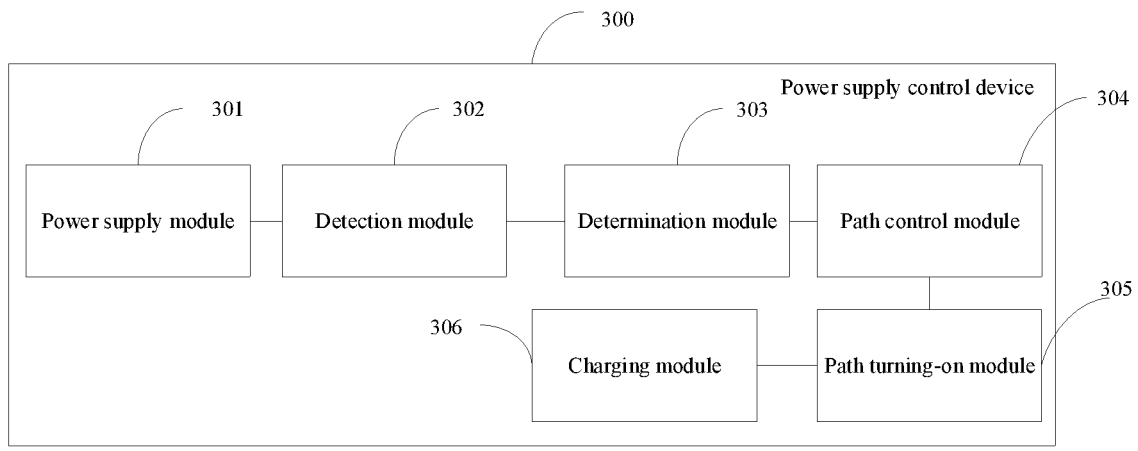
FIG. 11 is a structure diagram of another power supply control device according to an embodiment of the application.

In an exemplary implementation, referring to FIG. 11, the power supply control device 300 of the embodiment may further include:

a path turning-on module 305, configured to, after power is supplied to the electronic device system through the battery and when the current voltage of the battery is lower than a second preset voltage, turn on the power supplying path of the charger and the charging path of the charger; and a charging module 306, configured to charge the battery through the charging path of the charger and supply power to the electronic device system through the power supplying path of the charger.

Figure 12:
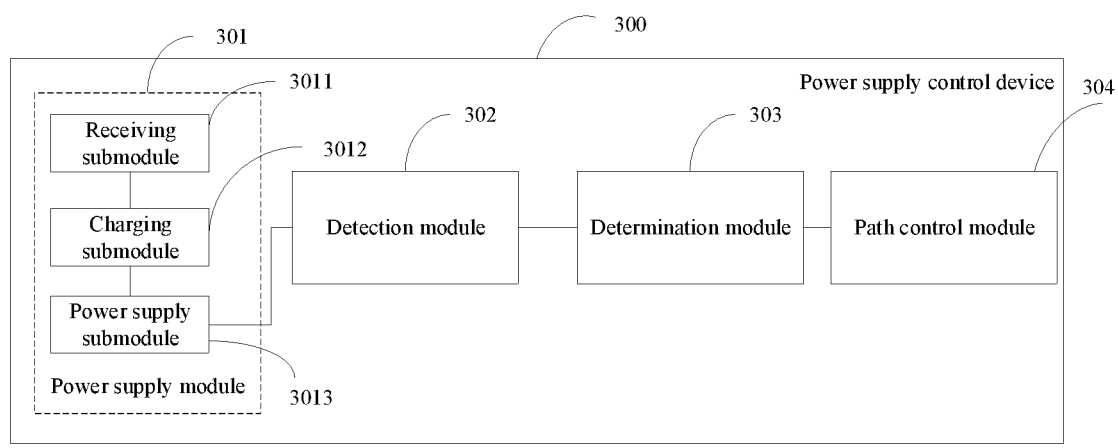
FIG. 12 is a structure diagram of another power supply control device according to an embodiment of the application.

As an exemplary implementation, referring to FIG. 12, in the embodiment, a current input by the charger may be divided into two currents respectively for charging and system power supply. That is, the power supply module 301 may include:

a receiving submodule 3011, configured to receive a current input by a charger and divide the current into a first current and a second current;

a charging submodule 3012, configured to transmit the first current to the battery to charge the battery through the charging path of the charger; and a power supply submodule 3013, configured to transmit the second current to the electronic device system to supply power to the electronic device system through the power supplying path of the charger.

Figure 13:
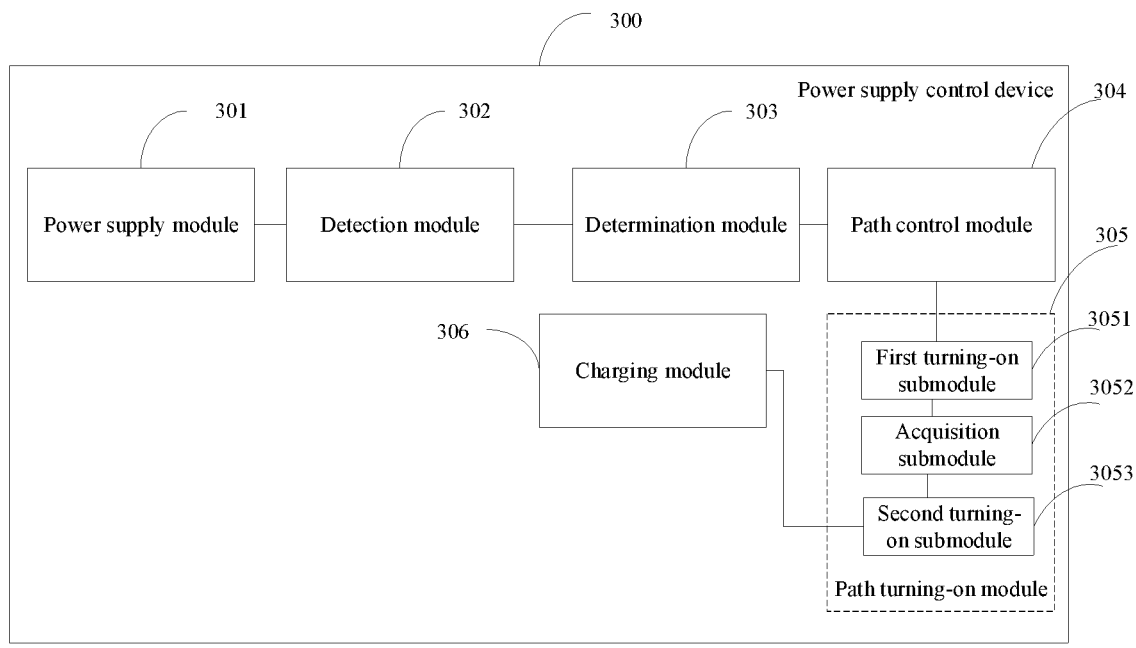
FIG. 13 is a structure diagram of another power supply control device according to an embodiment of the application.

As an exemplary implementation, referring to FIG. 13, the path turning-on module 305 may include:

a first turning-on submodule 3051, configured to turn on the charging path of the charger;

an acquisition submodule 3052, configured to acquire a voltage difference value between the current voltage of the battery and a first preset voltage; and a second turning-on submodule 3053, configured to, when the voltage difference value is greater than a preset threshold value, turn on the power supplying path of the charger.

During specific implementation, each of the above modules may be implemented as an independent entity and may also be randomly combined for implementation as the same or a plurality of entities. Specific implementation of each of the above modules may refer to the method embodiments and will not be elaborated herein.

From the above, it can be seen that, in the power supply control device 300 of the embodiment of the application, the power supply module 301, during charging, charges the battery through the charging path of the charger and supplies power to the electronic device system through the power supplying path of the charger; then the detection module 302 detects the current voltage of the battery in the charging process; the determination module 303 determines, according to the current voltage of the battery, whether the battery is completely charged or not; and the path control module 304 turns off, in response to determining that the battery is completely charged, the power supplying path of the charger and the charging path of the charger and supplies power to the electronic device system through the battery. According to the solution, when the battery is completely charged, the power supplying path of the charger may be turned off to cut off power supply of the charger to the electronic device system, and burnout of a PMIC due to increase of a power supply voltage of the system when the battery is completely charged may be prevented. Therefore, stability of the electronic device may be improved, and service life of the electronic device may be prolonged.

An electronic device includes a memory, a processor and a computer program stored in the memory and capable of running in the processor. The processor executes the computer program to implement the following operations:

during charging, a battery is charged through a charging path of a charger, and power is supplied to an electronic device system through a power supplying path of the charger;

a current voltage of the battery is detected in a charging process;

whether the battery is completely charged or not is determined according to the current voltage of the battery; and the power supplying path of the charger and the charging path of the charger are turned off in response to determining that the battery is completely charged, and power is supplied to the electronic device system through the battery.

In some embodiments, the operation that whether the battery is completely charged or not is determined according to the current voltage of the battery includes that:

when the current voltage of the battery is higher than a first preset voltage for more than a preset duration, it is determined that the battery is completely charged.

In some embodiments, after the operation that power is supplied to the electronic device system through the battery, the power supply control method further includes that:

when the current voltage of the battery is lower than a second preset voltage, the power supplying path of the charger and the charging path of the charger are turned on; and the battery is charged through the charging path of the charger, and power is supplied to the electronic device system through the power supplying path of the charger.

In some embodiments, the operation that the battery is charged through the charging path of the charger and power is supplied to the electronic device system through the power supplying path of the charger includes that:

a current input by a charger is received, and the current is divided into a first current and a second current;

the first current is transmitted to the battery to charge the battery through the charging path of the charger; and the second current is transmitted to the electronic device system to supply power to the electronic device system through the power supplying path of the charger.

In some embodiments, the operation that the power supplying path of the charger and the charging path of the charger are turned on includes that:

the charging path of the charger is turned on;

a voltage difference value between the current voltage of the battery and a first preset voltage is acquired; and when the voltage difference value is greater than a preset threshold value, the power supplying path of the charger is turned on.

In an exemplary embodiment, an electronic device is also provided, which includes a memory, a processor and a computer program stored in the memory and capable of running in the processor. The processor executes the computer program to implement the abovementioned power supply control method.

Figure 14:
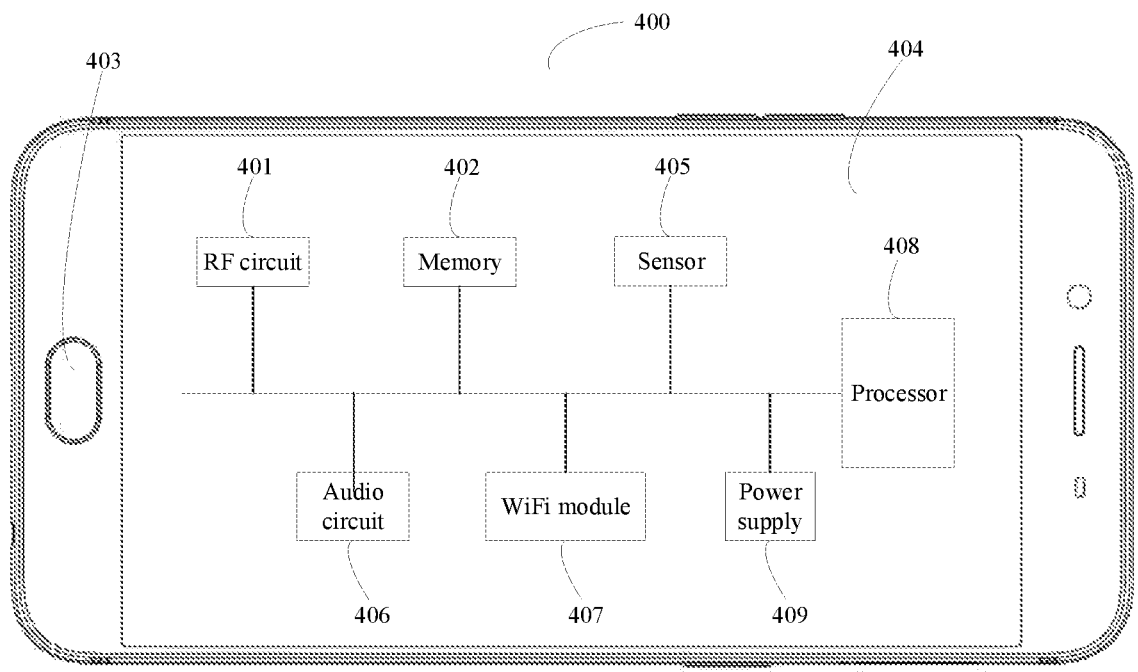
FIG. 14 is a structure diagram of an electronic device according to an embodiment of the application.

For example, referring to FIG. 14, the electronic device may be an electronic device. The electronic device 400 may include components such as a Radio Frequency (RF) circuit 401, a memory 402 including one or more than one computer-readable storage medium, an input unit 403, a display unit 404, a sensor 405, an audio circuit 406, a Wireless Fidelity (WiFi) module 407, a processor 408 including one or more than one processing core and a power supply 409. Those skilled in the art should know that the structure of the electronic device shown in FIG. 14 is not intended to limit the electronic device and may include components more or fewer than those shown in the figure or some components are combined or different component arrangements are adopted.

The RF circuit 401 may be configured to receive and send information or receive and send signals in a communication process, particularly after receiving downlink information of a base station, send it to one or more than one processor 408 for processing and, in addition, send involved uplink data to the base station. The RF circuit 401 usually includes, but not limited to, an antenna, at least one amplifier, a tuner, one or more oscillators, a Subscriber Identity Module (SIM) card, a transceiver, a coupler, a Low Noise Amplifier (LNA), a duplexer and the like. In addition, the RF circuit 401 may also communicate with a network and another device in a wireless communication manner. Any communication standard or protocol may be used for wireless communication, including, but not limited to, a Global System of Mobile communication (GSM), General Packet Radio Service (GPRS), Code Division Multiple Access (CDMA), Wideband Code Division Multiple Access (WCDMA), Long Term Evolution (LTE), an electronic mail, Short Messaging Service (SMS) and the like.

The memory 402 may be configured to store a software program and a module, and the processor 408 operates the software program and module stored in the memory 402, thereby executing various function applications and data processing. The memory 402 may mainly include a program storage region and a data storage region. Herein, the program storage region may store an operating system, an application program required by at least one function (for example, a sound playing function and an image playing function) and the like, and the data storage region may store data (for example, audio data and a phonebook) created according to use of the electronic device and the like. In addition, the memory 402 may include a high-speed Random Access Memory (RAM), and may further include a non-volatile memory, for example, at least one disk storage device, flash memory device or other volatile solid-state storage device. Correspondingly, the memory 402 may further include a memory controller to make the memory 402 accessible for the processor 408 and the input unit 403.

The input unit 403 may be configured to receive input digital or character information and generate keyboard, mouse, joystick, optical or trackball signal input related to user setting and function control of the electronic device. In an exemplary embodiment, the input unit 403 may include a touch-sensitive surface and another input device. The touch-sensitive surface, also called as a touch display screen or a touch panel, may collect a touch operation (for example, operation executed by a user with any proper object or accessory such as a finger and a stylus on the touch-sensitive surface or nearby the touch-sensitive surface) of the user thereon or nearby and drive a corresponding connection device according to a preset program. In an exemplary implementation, the touch-sensitive surface may include two parts, i.e., a touch detection device and a touch controller. Herein, the touch detection device detects a touch orientation of the user, detects a signal generated by the touch operation and sends the signal to the touch controller; and the touch controller receives touch information from the touch detection device and converts it into a contact coordinate for sending to the processor 408, and may receive and execute a command sent by the processor 408. In addition, the touch-sensitive surface may be implemented into multiple types such as a resistance type, a capacitance type, an infrared type and a surface acoustic wave type. Besides the touch-sensitive surface, the input unit 403 may further include the other input device. In at least one exemplary embodiment, the other input device may include, but not limited to, one or more of a physical keyboard, a function key (for example, a volume control key and an on-off key), a trackball, a mouse, a joystick, a fingerprint recognition module and the like.

The display unit 404 may be configured to display information input by the user or information provided for the user and various graphical user interfaces of the electronic device. These graphical user interfaces may be formed by graphs, texts, icons, videos or any combination thereof. The display unit 404 may include a display panel. In an exemplary implementation, the display panel may be configured in form of a Liquid Crystal Display (LCD), an Organic Light-Emitting Diode (OLED) and the like. Furthermore, the touch-sensitive surface may cover the display panel, the touch-sensitive surface, after detecting the touch operation executed thereon or nearby, transmits it to the processor 408 to determine a type of a touch event, and the processor 408 subsequently provides corresponding visual output on the display panel according to the type of the touch event. Although the touch-sensitive surface and display panel in FIG. 14 realize input and output functions as two independent components, the touch-sensitive surface and the display panel may be integrated to realize the input and output functions in some embodiments.

The electronic device may further include at least one sensor 405, for example, a light sensor, a motion sensor and another sensor. In at least one exemplary embodiment, the light sensor may include an ambient light sensor and a proximity sensor. Herein, the ambient light sensor may regulate brightness of the display panel according to ambient light, and the proximity sensor may turn off the display panel and/or backlight when the electronic device is moved to an ear. As a motion sensor, a gravitational acceleration sensor may detect a magnitude of an acceleration in each direction (usually three axes), may detect a magnitude and direction of the gravity under a motionless condition, and may be configured for an application recognizing a posture of a mobile phone (for example, landscape and portrait switching, a related game and magnetometer posture calibration), a vibration recognition related function (for example, a pedometer and knocking) and the like. Other sensors, for example, a gyroscope, a barometer, a hygrometer, a thermometer and an infrared sensor, which may be configured in the electronic device will not be elaborated herein.

The audio circuit 406 may provide an audio interface between the user and the electronic device through a loudspeaker and a microphone. The audio circuit 406 may convert received audio data into an electric signal and transmit it to the loudspeaker, and then the loudspeaker converts it into a sound signal for output. On the other aspect, the microphone converts a collected sound signal into an electric signal, and then the audio circuit 406 receives and converts it into audio data and outputs the audio data to the processor 408 for processing and sending to, for example, another electronic device through the RF circuit 401 or outputs the audio data to the memory 402 for further processing. The audio circuit 406 may further include an earplug jack for providing communication between an external earphone and the electronic device.

WiFi is a short-distance wireless communication technology. The electronic device may help the user to receive and send an electronic mail, browse a webpage, access streaming media and the like through the WiFi module 407, and provides wireless broadband Internet access for the user. Although the WiFi module 407 is shown in FIG. 14, it can be understood that it is not a necessary component of the electronic device and may completely be omitted according to a requirement without changing the scope of the essence of the application.

The processor 408 is a control center of the electronic device, connects each part of the whole electronic device by virtue of various interfaces and lines and executes various functions and data processing of the electronic device by operating or executing the software program and/or module stored in the memory 402 and calling data stored in the memory 402, thereby monitoring the whole electronic device. In an exemplary implementation, the processor 408 may include one or more processing cores. As an exemplary implementation, the processor 408 may integrate an application processor and a modulation and demodulation processor. Herein, the application processor mainly processes the operating system, a user interface, an application program and the like, and the modulation and demodulation processor mainly processes wireless communication. It can be understood that the modulation and demodulation processor may also not be integrated into the processor 408.

The electronic device further includes a power supply 409 (for example, a battery) supplying power to each component. As an exemplary implementation, the power supply may be logically connected with the processor 408 through a power management system, thereby realizing functions of charging and discharging management, power consumption management and the like through the power management system. The power supply 409 may further include any component such as one or more than one direct current or alternating current power supply, recharging system, power failure detection circuit, power converter or inverter and power state indicator.

Although not shown in the figure, the electronic device may further include a Bluetooth module, a camera and the like, which will not be elaborated herein.

In the embodiment, the processor 408 of the electronic device may load an executable file corresponding to a process of one or more than one application program into the memory 402 according to the following instruction, and the processor 408 operates the application program stored in the memory 402, thereby realizing various functions:

during charging, a battery is charged through a charging path of a charger, and power is supplied to an electronic device system through a power supplying path of the charger; then a current voltage of the battery is detected in a charging process; whether the battery is completely charged or not is determined according to the current voltage of the battery; and the power supplying path of the charger and the charging path of the charger are turned off in response to determining that the battery is completely charged, and power is supplied to the electronic device system through the battery.

Herein, the operation that whether the battery is completely charged or not is determined according to the current voltage of the battery includes that: when the current voltage of the battery is higher than a first preset voltage for more than a preset duration, it is determined that the battery is completely charged.

In an exemplary implementation, the processor 408 further realizes the following functions: when the current voltage of the battery is lower than a second preset voltage, the power supplying path of the charger and the charging path of the charger are turned on; and the battery is charged through the charging path of the charger, and power is supplied to the electronic device system through the power supplying path of the charger.

Herein, the operation that the battery is charged through the charging path of the charger and power is supplied to the electronic device system through the power supplying path of the charger includes that:

a current input by a charger is received, and the current is divided into a first current and a second current;

the first current is transmitted to the battery to charge the battery through the charging path of the charger; and the second current is transmitted to the electronic device system to supply power to the electronic device system through the power supplying path of the charger.

Herein, the operation that the power supplying path of the charger and the charging path of the charger are turned on includes that:

the charging path of the charger is turned on;

a voltage difference value between the current voltage of the battery and a first preset voltage is acquired; and when the voltage difference value is greater than a preset threshold value, the power supplying path of the charger is turned on.

From the above, it can be seen that the embodiment of the application provides the electronic device, and the electronic device, during charging, charges the battery through the charging path of the charger, supplies power to the electronic device system through the power supplying path of the charger, then detects the current voltage of the battery in the charging process, determines, according to the current voltage of the battery, whether the battery is completely charged or not, and in response to determining that the battery is completely charged, turns off the power supplying path of the charger and the charging path of the charger and supplies power to the electronic device system through the battery. According to the solution, when the battery is completely charged, the power supplying path of the charger may be turned off to cut off power supply of the charger to the electronic device system, and burnout of a PMIC due to increase of a power supply voltage of the system when the battery is completely charged may be prevented. Therefore, stability of the electronic device may be improved.

A storage medium stores multiple instructions, the instructions are suitable to be loaded by a processor to execute the following operations:

during charging, battery is charged through a charging path of a charger, and power is supplied to an electronic device system through a power supplying path of the charger;

a current voltage of the battery is detected in a charging process;

whether the battery is completely charged or not is determined according to the current voltage of the battery; and the power supplying path of the charger and the charging path of the charger are turned off in response to determining that the battery is completely charged, and power is supplied to the electronic device system through the battery.

In some embodiments, the operation that whether the battery is completely charged or not is determined according to the current voltage of the battery includes that:

when the current voltage of the battery is higher than a first preset voltage for more than a preset duration, it is determined that the battery is completely charged.

In some embodiments, after the operation that power is supplied to the electronic device system through the battery, the power supply control method further includes that:

when the current voltage of the battery is lower than a second preset voltage, the power supplying path of the charger and the charging path of the charger are turned on; and the battery is charged through the charging path of the charger, and power is supplied to the electronic device system through the power supplying path of the charger.

In some embodiments, the operation that the battery is charged through the charging path of the charger and power is supplied to the electronic device system through the power supplying path of the charger includes that:

a current input by a charger is received, and the current is divided into a first current and a second current;

the first current is transmitted to the battery to charge the battery through the charging path of the charger; and the second current is transmitted to the electronic device system to supply power to the electronic device system through the power supplying path of the charger.

In some embodiments, the operation that the power supplying path of the charger and the charging path of the charger are turned on includes that:

the charging path of the charger is turned on;

a voltage difference value between the current voltage of the battery and a first preset voltage is acquired; and when the voltage difference value is greater than a preset threshold value, the power supplying path of the charger is turned on.

In some embodiments, after the operation that whether the battery is completely charged or not is determined according to the current voltage of the battery, the method further includes that:

the current voltage of the battery is continued to be detected in response to determining that the battery is not completely charged.

In some embodiments, the operation that whether the battery is completely charged or not is determined according to the current voltage of the battery further includes that:

when the current voltage of the battery is not higher than the first preset voltage or when the current voltage of the battery is higher than the first preset voltage for less than the preset duration, it is determined that the battery is not completely charged.

Those of ordinary skill in the art should know that all or part of the operations in each method of the abovementioned embodiments may be completed by instructing, through a program, related hardware, the program may be stored in a computer-readable storage medium, and the storage medium may include a Read Only Memory (ROM), a RAM, a magnetic disk, an optical disk or the like.

The power supply control method and device, storage medium and electronic device provided in the embodiments of the application are introduced above in detail. The principle and implementation modes of the application are elaborated with specific examples in the disclosure. The embodiments are described above only to help the method and main idea of the application to be understood. In addition, those skilled in the art may make variations to the specific implementation modes and the application scope according to the idea of the application. From the above, the contents of the specification should not be understood as limits to the application.

What is claimed is:

1. A power supply control method, comprising:

during charging, charging a battery through a charging path of a charger, and supplying power to an electronic device system through a power supplying path of the charger;

detecting a current voltage of the battery in a charging process;

determining, according to the current voltage of the battery, whether the battery is completely charged or not; and turning off, in response to determining that the battery is completely charged, the power supplying path of the charger and the charging path of the charger, and supplying power to the electronic device system through the battery;

wherein when the current voltage of the battery is lower than a second preset voltage, turning on the power supplying path of the charger and the charging path of the charger, wherein turning on the power supplying path of the charger and the charging path of the charger comprises: turning on the charging path of the charger; acquiring a voltage difference value between the current voltage of the battery and a first preset voltage; and when the voltage difference value is greater than a preset threshold value, turning on the power supplying path of the charger.

2. The power supply control method as claimed in claim 1, wherein determining, according to the current voltage of the battery, whether the battery is completely charged or not comprises:

when the current voltage of the battery is higher than a first preset voltage for more than a preset duration, determining that the battery is completely charged.

3. The power supply control method as claimed in claim 1, further comprising:

charging the battery through the charging path of the charger, and supplying power to the electronic device system through the power supplying path of the charger.

4. The power supply control method as claimed in claim 1, wherein charging the battery through the charging path of the charger and supplying power to the electronic device system through the power supplying path of the charger comprises:

receiving a current input by a charger, and dividing the current into a first current and a second current; and transmitting the first current to the battery to charge the battery through the charging path of the charger, and transmitting the second current to the electronic device system to supply power to the electronic device system through the power supplying path of the charger.

5. The power supply control method as claimed in claim 1, further comprising:

continuing, in response to determining that the battery is not completely charged, to detect the current voltage of the battery.

6. The power supply control method as claimed in claim 1, wherein determining, according to the current voltage of the battery, whether the battery is completely charged or not further comprises:

when the current voltage of the battery is not higher than a first preset voltage or when the current voltage of the battery is higher than the first preset voltage for less than the preset duration, determining that the battery is not completely charged.

7. A power supply control device, comprising:

at least one processor; and a computer readable storage medium, coupled to the at least one processor and storing at least one computer executable instructions which, when being executed by the at least one processor, cause the at least one processor to carry out following program units:

a power supply module, configured to, during charging, charge a battery through a charging path of a charger and supply power to an electronic device system through a power supplying path of the charger;

a detection module, configured to detect a current voltage of the battery in a charging process;

a determination module, configured to determine, according to the current voltage of the battery, whether the battery is completely charged or not; and a path control module, configured to turn off, in response to determining, by the determination module, that the battery is completely charged, the power supplying path of the charger and the charging path of the charger and supply power to the electronic device system through the battery;

a path turning-on module, configured to, after power is supplied to the electronic device system through the battery and when the current voltage of the battery is lower than a second preset voltage, turn on the power supplying path of the charger and the charging path of the charger, wherein the path turning-on module comprises: a first turning-on submodule, configured to turn on the charging path of the charger; an acquisition submodule, configured to acquire a voltage difference value between the current voltage of the battery and a first preset voltage; and a second turning-on submodule, configured to, when the voltage difference value is greater than a preset threshold value, turn on the power supplying path of the charger.

8. The power supply control device as claimed in claim 7, wherein the determination module is configured to, when the current voltage of the battery is higher than a first preset voltage for more than a preset duration, determine that the battery is completely charged.

9. The power supply control device as claimed in claim 7, wherein the at least one computer executable instructions, when being executed by the at least one processor, cause the at least one processor to further carry out following program modules:

a charging module, configured to charge the battery through the charging path of the charger and supply power to the electronic device system through the power supplying path of the charger.

10. The power supply control device as claimed in claim 7, wherein the power supply module comprises:

a receiving submodule, configured to receive a current input by a charger and divide the current into a first current and a second current;

a charging submodule, configured to transmit the first current to the battery to charge the battery through the charging path of the charger; and a power supply submodule, configured to transmit the second current to the electronic device system to supply power to the electronic device system through the power supplying path of the charger.

11. The power supply control device as claimed in claim 10, wherein the determination module is further configured to continue, in response to determining that the battery is not completely charged, to detect the current voltage of the battery.

12. The power supply control device as claimed in claim 7, wherein the determination module is further configured to, when the current voltage of the battery is not higher than the first preset voltage or when the current voltage of the battery is higher than the first preset voltage for less than the preset duration, determine that the battery is not completely charged.

13. A storage medium, storing multiple instructions, the instructions being able to be loaded by a processor to execute the power supply control method as claimed in claim 1.

14. An electronic device, comprising a memory, a processor and a computer program stored in the memory and capable of running in the processor, the processor executing the computer program to implement the following operations:

during charging, charging a battery through a charging path of a charger, and supplying power to an electronic device system through a power supplying path of the charger;

detecting a current voltage of the battery in a charging process;

determining, according to the current voltage of the battery, whether the battery is completely charged or not; and turning off, in response to determining that the battery is completely charged, the power supplying path of the charger and the charging path of the charger, and supplying power to the electronic device system through the battery;

wherein when the current voltage of the battery is lower than a second preset voltage, turning on the power supplying path of the charger and the charging path of the charger, wherein turning on the power supplying path of the charger and the charging path of the charger comprises: turning on the charging path of the charger; acquiring a voltage difference value between the current voltage of the battery and a first preset voltage; and when the voltage difference value is greater than a preset threshold value, turning on the power supplying path of the charger.

15. The electronic device as claimed in claim 14, wherein determining, according to the current voltage of the battery, whether the battery is completely charged or not comprises:
when the current voltage of the battery is higher than a first preset voltage for more than a preset duration, determining that the battery is completely charged.

16. The electronic device as claimed in claim 14, wherein, after supplying power to the electronic device system through the battery, the power supply control method further comprises:
charging the battery through the charging path of the charger, and supplying power to the electronic device system through the power supplying path of the charger.

17. The electronic device as claimed in claim 14, wherein charging the battery through the charging path of the charger and supplying power to the electronic device system through the power supplying path of the charger comprises:
receiving a current input by a charger, and dividing the current into a first current and a second current; and
transmitting the first current to the battery to charge the battery through the charging path of the charger, and transmitting the second current to the electronic device system to supply power to the electronic device system through the power supplying path of the charger.

* * * * *